United States Patent
Kale et al.

(10) Patent No.: US 9,055,151 B2
(45) Date of Patent: Jun. 9, 2015

(54) METHOD TO SET THE FLAG AS REPLIED OR FORWARDED TO ALL REPLIED OR FORWARDED VOICE MESSAGES

(75) Inventors: Deepak Kale, Warje (IN); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 781 days.

(21) Appl. No.: 12/488,970

(22) Filed: Jun. 22, 2009

(65) Prior Publication Data

US 2010/0322397 A1 Dec. 23, 2010

(51) Int. Cl.
*H04M 1/64* (2006.01)
*H04M 3/533* (2006.01)

(52) U.S. Cl.
CPC .................. *H04M 3/53333* (2013.01)

(58) Field of Classification Search
USPC ....................................................... 379/88.22
See application file for complete search history.

(56) References Cited

U.S. PATENT DOCUMENTS

| | | | |
|---|---|---|---|
| 5,177,780 A * | 1/1993 | Kasper et al. ................. | 455/413 |
| 5,313,515 A * | 5/1994 | Allen et al. ................... | 455/413 |
| 5,734,915 A | 3/1998 | Roewer | |
| 6,006,218 A | 12/1999 | Breese et al. | |
| 6,272,469 B1 | 8/2001 | Koritzinsky et al. | |
| 6,353,445 B1 | 3/2002 | Babula et al. | |
| 6,377,162 B1 | 4/2002 | Delestienne et al. | |
| 6,389,276 B1 * | 5/2002 | Brilla et al. ................... | 455/413 |
| 6,424,996 B1 | 7/2002 | Killcommons et al. | |
| 6,434,572 B2 | 8/2002 | Derzay et al. | |
| 6,556,666 B1 * | 4/2003 | Beyda et al. ................. | 379/88.12 |
| 6,598,011 B1 | 7/2003 | Howards Koritzinsky et al. | |
| 6,630,883 B1 * | 10/2003 | Amin et al. ................... | 340/7.29 |
| 6,801,604 B2 | 10/2004 | Maes et al. | |
| 6,823,184 B1 | 11/2004 | Nelson | |
| 6,839,896 B2 | 1/2005 | Coffman et al. | |
| 6,865,259 B1 * | 3/2005 | Shaffer et al. ............... | 379/88.12 |
| 6,941,342 B1 | 9/2005 | Nelson | |
| 6,983,138 B1 * | 1/2006 | Helferich ..................... | 455/412.1 |
| 6,996,800 B2 | 2/2006 | Lucassen et al. | |
| 7,013,279 B1 | 3/2006 | Nelson | |
| 7,020,841 B2 | 3/2006 | Dantzig et al. | |
| 7,106,852 B1 | 9/2006 | Nelson et al. | |
| 7,127,499 B1 | 10/2006 | Accardi et al. | |
| 7,137,126 B1 | 11/2006 | Coffman et al. | |
| 7,167,830 B2 | 1/2007 | Sravanapudi et al. | |
| 7,216,351 B1 | 5/2007 | Maes | |
| 7,260,190 B2 * | 8/2007 | Fellenstein et al. ......... | 379/88.24 |
| 7,286,649 B1 | 10/2007 | Nelson et al. | |
| 7,315,613 B2 | 1/2008 | Kleindienst et al. | |
| 7,369,647 B2 | 5/2008 | Gao et al. | |
| 7,369,649 B2 | 5/2008 | Zhong | |

(Continued)

*Primary Examiner* — Joseph T Phan
(74) *Attorney, Agent, or Firm* — Sheridan Ross P.C.

(57) ABSTRACT

To assist with the usability of voice messaging systems, a technique is provided that provides audible information to a user about the status of one or more messages in the system. An audible message is played to the user indicating whether they have forwarded, replied, saved, or otherwise addressed a voice message. The audible indication can be triggered by the message recipient trying to reply, forward or otherwise access a message in the voice messaging system. This can be especially useful when the voice messaging system is accessed from a phone, such as an IP telephone or SIP phone. The technique at least allows users to know which voice messages they have addressed as well as to provide a summary of one or more messages in the voice messaging system such as 3 unread, 2 replied, 1 forwarded, and a total of 12 messages with message duration of 11 minutes.

20 Claims, 2 Drawing Sheets

(56) References Cited

U.S. PATENT DOCUMENTS

| | | |
|---|---|---|
| 7,383,282 B2 | 6/2008 | Whitehead et al. |
| 7,418,086 B2 | 8/2008 | Sravanapudi et al. |
| 7,457,879 B2 | 11/2008 | Horvitz et al. |
| 7,478,171 B2 | 1/2009 | Ramaswamy et al. |
| 7,606,405 B2 | 10/2009 | Sawyer et al. |
| 7,606,861 B2 | 10/2009 | Killcommons et al. |
| 7,885,392 B2 * | 2/2011 | Fujita-Yuhas ............... 379/88.25 |
| 7,978,830 B2 * | 7/2011 | O'Neill ....................... 379/88.14 |
| 8,140,335 B2 | 3/2012 | Kennewick et al. |
| 8,250,630 B2 | 8/2012 | Mendonca |
| 2006/0155267 A1 | 7/2006 | Berzak et al. |
| 2007/0116197 A1 * | 5/2007 | O'Neill ........................ 379/67.1 |
| 2007/0150612 A1 | 6/2007 | Chaney et al. |
| 2009/0171203 A1 | 7/2009 | Avital et al. |
| 2009/0227293 A1 * | 9/2009 | Yulo ............................. 455/566 |
| 2010/0020944 A1 * | 1/2010 | Ray ................................ 379/87 |
| 2010/0322395 A1 | 12/2010 | Michaelis et al. |
| 2010/0322397 A1 * | 12/2010 | Kale et al. ................... 379/88.23 |
| 2011/0143722 A1 * | 6/2011 | Shaw et al. .................. 455/413 |
| 2011/0258153 A1 | 10/2011 | Kamar et al. |

* cited by examiner

METHOD TO SET THE FLAG AS REPLIED OR FORWARDED TO ALL REPLIED OR FORWARDED VOICE MESSAGES

CROSS-REFERENCE TO RELATED APPLICATIONS

This application is related to U.S. patent application Ser. No. 12/489,043, entitled "Unified Communications Appliance," filed herewith, which is incorporated herein by reference in its entirety.

BACKGROUND

Voice messaging systems provide users an easy and effective way to exchange communications when one user is not available. Typically, a caller can leave a voice message for a callee which can then be retrieved by the callee at a later date and time. Other functions available to the callee upon retrieval of the left message include playback, saving, fast forwarding, rewinding, skipping, archiving, and the like.

Presently when a user is interacting with a voicemail system from an IP phone, there is no way to know on-the-fly if the recipient has responded to one or more of the voicemail messages while listening to the selected voicemail message. In an exemplary scenario, when a user dials a number, the call goes into voicemail if is not answered as per set rules associated with a specific coverage path. When the user retrieves the voicemail message, the user could respond with a reply or forward action. However, when the user revisits the voicemail message list and accesses the same message to which they have already responded to, they could end up replying or forwarding the message again as there is no method to know if they have responded to the voicemail message already.

DESCRIPTION OF RELATED ART

In U.S. Pat. No. 7,369,647, there is described a system and method that notifies a voice mailbox subscriber of the receipt of a message in a voicemail server using instant messaging. A preferred embodiment of the invention includes an enhanced notification server that receives a notification of the message from the voicemail server, queries the availability of an instant messaging client via an instant messaging presence server and forwards the notification to the instant messaging client via the instant messaging presence server if the instant messaging client is available. In preferred embodiments, provisions are made to forward the message to the subscriber via instant messaging.

In U.S. Pat. No. 5,177,780, there is described a voicemail notification arrangement that provides an audible notification to a mobile radio telephone subscriber that one or more incoming calls have been redirected to the subscriber's mailbox. An unanswered incoming call is directed to the voicemail system which stores the calling party's voice message. A flag is set in a feature database which includes this feature for the called subscriber. When the subscriber subsequently originates a call from their cellular or mobile radio telephone, or answers an incoming call, an audible notification (e.g., a burst of special tone) is provided via the speaker of the mobile radio phone headset to alert the subscriber at the outset of an active call that there are one or more voicemail messages in his/her voice mailbox. The flag is cleared when the voice messages are retrieved or upon the first call originated by the mobile subscriber, depending upon the mode of operation active in the subscriber's system.

SUMMARY

However, when a user is interacting with the voice messaging system from a phone or an IP phone (such as a SIP-based communications device), there is no way for the user to know whether they have acted upon a message. More specifically, when the user calls into the voice messaging system, no indication is given to the user that they have either replied to or forwarded a left voice message.

Accordingly, one exemplary aspect of this invention is directed toward voice messaging systems.

Another exemplary aspect is directed toward tracking the status of one or more messages in a voice messaging system.

Still further aspects of the invention are directed towards setting a "replied to" flag for one or more messages in a voice messaging system.

Additional aspects of the invention are directed toward setting a "forwarded" flag for one or more messages in a voice messaging system.

Still further aspects of the invention relate to providing an indication to a user that a message has been flagged.

Aspects of the invention also relate to playing to a user an audible indication that a message has been replied to.

Aspects of the invention also relate to playing to a user an audible indication regarding the status of a message.

Even further aspects of the invention relate to playing an audible message to a user that a voice message has been forwarded.

In accordance with one exemplary embodiment, a voice messaging system user will be able to know whether or not they have responded to a left voice message. If a user has replied to or forwarded a left voicemail message, an audible indication of such, such as "you have replied to this message on date/time," can be played to the user which can, for example, save the user time and wasted effort by re-replying or re-forwarding the voice message again. One exemplary advantage of this technique is it brings more transparency to the voice messaging process.

In accordance with an exemplary operational embodiment, when the user dials into a voice messaging system to listen to voice messages they have received, there may be some messages that are new, some messages that have been replied to or forwarded, and some messages that have been saved or archived. As the user selects how to handle each of the voice messages in the voice messaging system, the system can automatically recognize one or more flags associated with certain messages. As discussed, the flags will be set when a user has forwarded or replied to a voice message. Upon the user trying to access one of these messages that has been replied to or forwarded, the flag can automatically trigger an announcement such as "you have replied/forwarded (as appropriate) to this message on date/time." In addition, an audible message can be triggered even if a user has not replied or forwarded a message. For example, the audible message could be "you have not replied to this message." In general, the exemplary aspects of this invention and techniques disclosed herein can be extended to providing any type of status identifier corresponding to a particular status of a message in a voice messaging system via an audible message status statement.

For example, upon accessing a mailbox, a user can be given information such as the number of new messages, the total number of messages, the number of archived messages, the number of messages responded to, the number of messages that have been forwarded, the length of one or more of the messages, or cumulative length of recorded messages, or in general any information relating to the status of one or more messages in the voice messaging system.

For example, upon a user accessing the voice messaging system, they can be given a general status message such as "you have three new messages, you have replied to two messages, and forwarded one message," with, for example, additional information such as caller ID information optionally associated with the generated status message. Therefore, for example, upon accessing the voice messaging system, the user can be provided with a message that states "you have three new messages and one replied to message from Pat Smith at (800) 555-1212 that was left on April 15 at 4:43 pm." In accordance with one exemplary embodiment, this audible status message is provided when the user enters the system or tries to access any of the messages in the voice messaging system.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

These and other advantages of the invention will be apparent to those skilled in the art with reference to the following detailed description and the accompanying figures.

DETAILED DESCRIPTION

The invention will be described below in relation to a communications environment, such as a communications environment with voice messaging. Although well suited for use with circuit-switched or packet-switched networks, the invention is not limited to use with any particular type of communications system or configuration of system elements and those skilled in the art will recognize that the disclosed techniques may be used in any application in which it is desirable to provide audible indications of message status. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description admits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
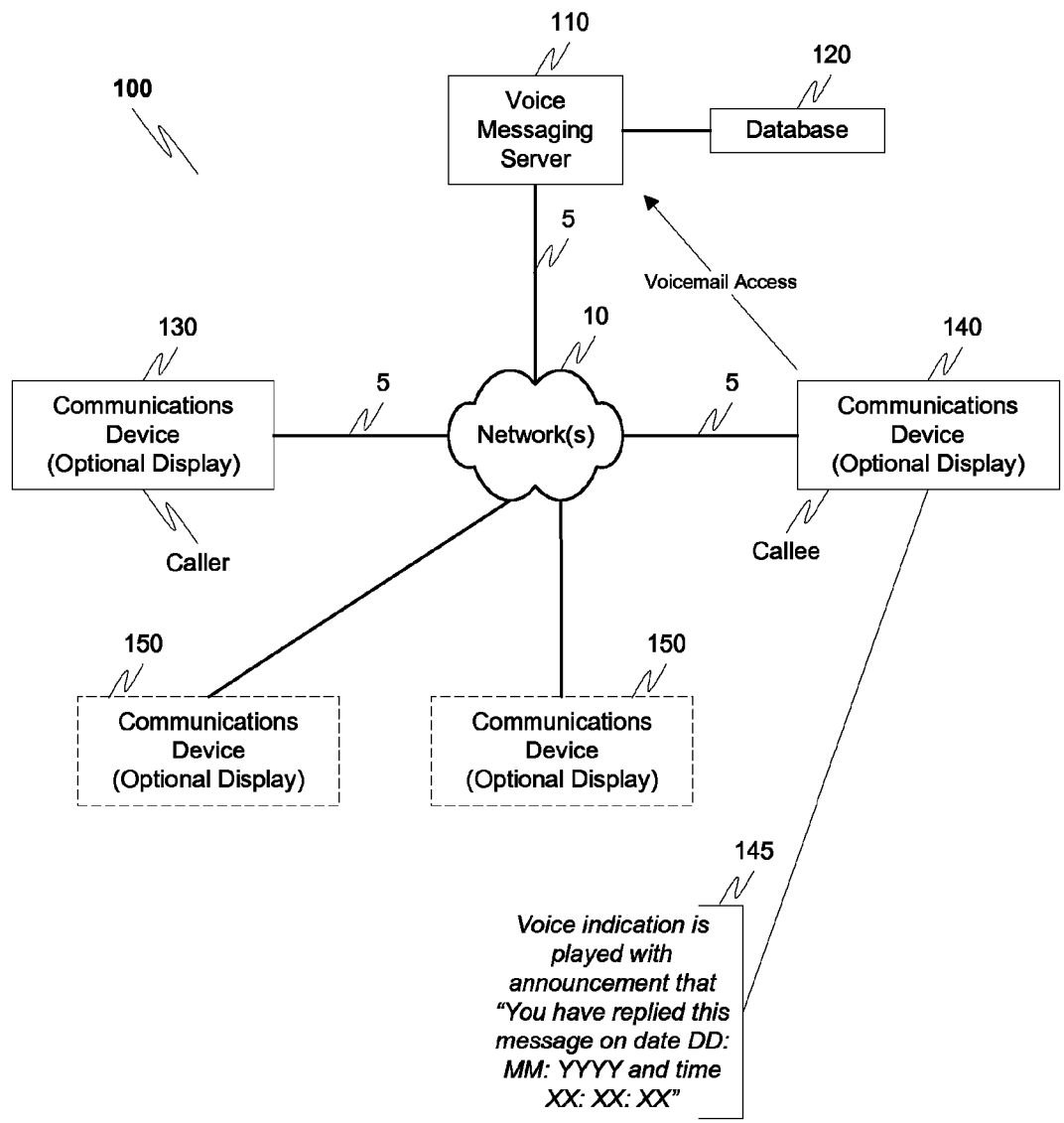
FIG. 1 illustrates an exemplary architectural diagram of a communications system according to this invention.

FIG. 1 illustrates an exemplary communication system 100. The communication system 100 comprises a voice messaging server 110, database 120, communications device 130, communications device 140, and additional communications device(s) 150. The various devices are connected via one or more networks 10 and links 5. The communications devices include an optional display as well as typical functionality such as speaker, microphone, input keys, and the like. The communications system 100 can operate on any protocol, such as the Session Initiation Protocol (SIP), H.323, packet switched, or circuit-switched networking, and in general any protocol and/or architecture that allows communications between the various connected elements. The network 10 includes common and well known components, such as switches, routers and the like.

The voice messaging server 110 is capable of handling VoIP traffic as well as traditional telephone calls from such devices as wired or wireless VoIP telephones, PDAs, personal computers, mobile phones, land-line phones, and in general any type of communications device that is able to communicate with the voice messaging server 110.

According to an exemplary aspect of the invention, the communications devices have access to the voice messaging server and database. The voice messaging server is an entity capable of handling voicemail messages including sending and receiving a voicemail message. The database 120 is where all voicemail messages are stored. The system can optionally be associated with a communications server (not shown) that allows integration with the voice messaging server and provides functionality, such as authentication and access to the voice messaging server. The system could also be partially of fully integrated into a communications server. A typical communications server can include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc. The server can also be configured to execute one or more telecommunication applications.

Associated with one or more of the voice messaging server and communication server are one or more administered properties, with these properties including such things as subscriber ID, mailbox ID, voicemail messages, time stamps, date stamps, and the like. Also included with each voicemail message can be information, for example, stored in a header, such as the voice message ID, calling party and name, calling party number, and the like.

In operation, caller 130 calls callee 140 via network 10 and links 5. If the callee 140 is unavailable, the caller is forwarded to the voice messaging server 110 where the caller 130 can leave a message for the callee 140 which is stored in database 120. As discussed, information such as duration of the left voicemail message, caller ID information, time and date stamp information, and the like can be associated with a voicemail message that is left in database 120.

At some point later in time, the callee 140 accesses the voice messaging server 110 via well-known techniques. This access can be from any type of communications device 140 including, but not limited to, a packet-based communications device, circuit-switched communications device, computer, enterprise voicemail system, or the like. As the callee 140 accesses various messages stored in database 120 via the voice messaging server 110, a flag is dynamically associated with each of the messages that correspond to the status of the message. For example, if the callee 140 forwards the message, the flag is set to "forwarded." If the callee 140 replies to the message, the flag is set to "replied to." In general, there are an unlimited number of possibilities for setting the flag corresponding to a particular action that was taken in relation to each of the voice messages stored in database 120.

In addition to the flag being associated with one or more messages in the database 120, there is a corresponding audible message associated with each of the flags that can also be stored on database 120. This audible message, as discussed hereinafter, allows the status of one or more of the voicemail messages stored in database 120 to be played to the callee 140 upon subsequent attempts to access the one ore more voicemail messages stored in database 120.

Therefore, for example, when the callee 140 receives a voicemail that is stored in database 120, the callee 140 can respond to or forward the left message. Upon taking this action, the voice messaging server 110 flags the message with the appropriate flag corresponding to the action taken which is then stored in database 120. Upon the callee 140 later accessing the voice messaging server 110, and in particular accessing one of the replied to or forwarded messages, a voice indication is presented to the callee 140. More specifically, if the callee 140 already replied to the message, a message such as "this message was replied to on date/time" is played. Alternatively, if the message is forwarded a verbal message such as "this message was forwarded on date/time."

Optionally, the callee 140 can be given the option of recording a custom audible message with a voice message. A "custom flag" could then be associated with the message and when the callee attempts to access the message at a later time, this custom message played back to the callee 140.

Figure 2:
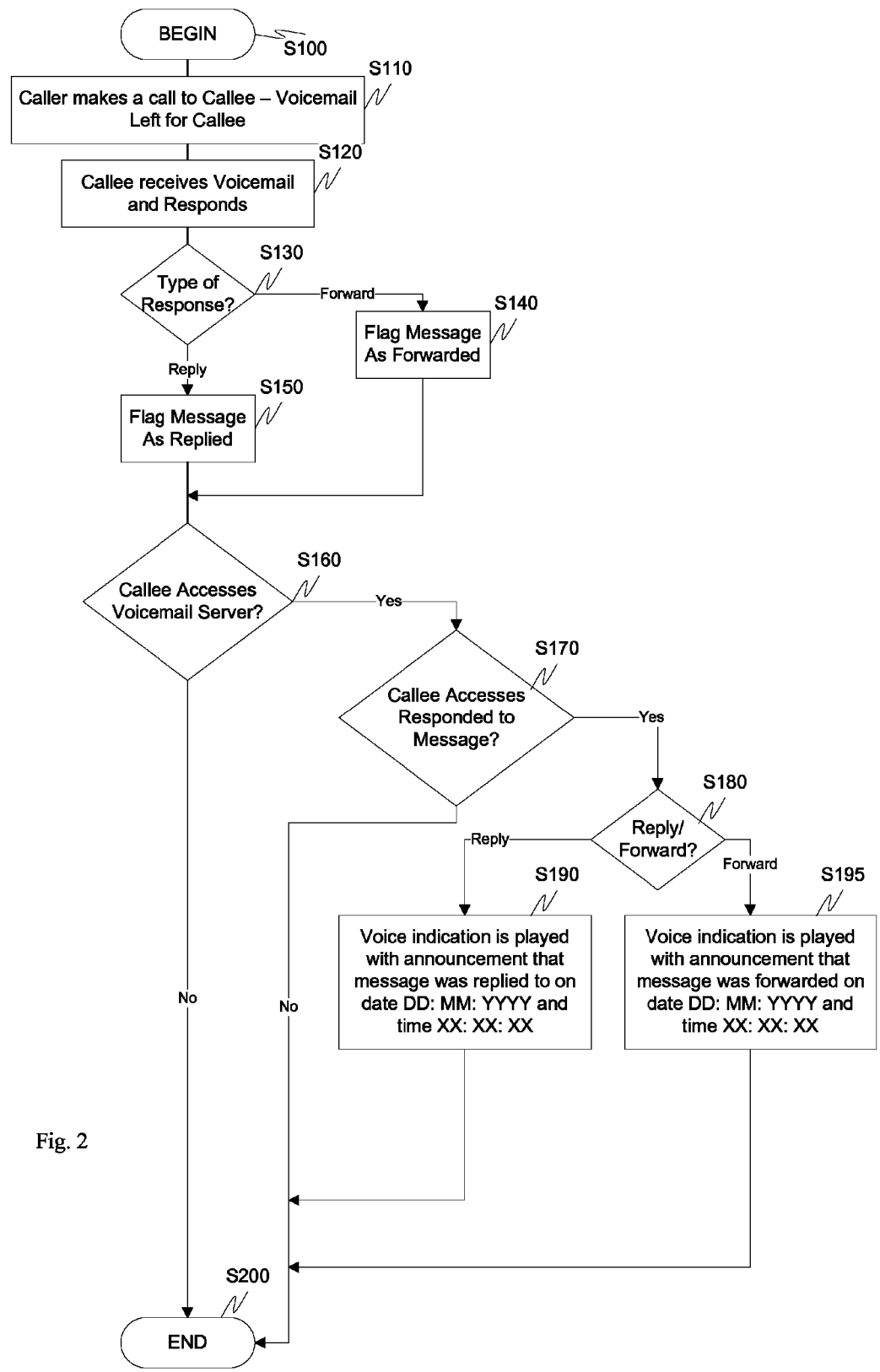
FIG. 2 is a flowchart illustration an exemplary method of message notification according to this invention.

FIG. 2 outlines an exemplary method for message handling according to this invention. In particular, control begins at step S100 and continues to step S110. In step S110, a caller makes a call to a callee and leaves a voicemail for the callee. Next, in step S120, and after accessing a voicemail server, the callee receives the voicemail message and is provided with functionality to take an action thereon. Then, in step S130, a determination is made what type of action has been taken, with one option being forwarding of the message and another option being replying to the message. If the message is forwarded, control continues to step S140 where the message is flagged as having been forwarded. Alternatively, if the message was replied to, control jumps to step S150 with a flag being set indicating that the message was replied to. As discussed, information associated with the reply or forwarding can be saved such as to whom the message was forwarded, data and time information and whether or not the message was supplemented with additional content, such as a preface to the forwarded message with a comment. Control then continues to step S160.

In step S160, a determination is made whether the callee again accesses the voicemail server and again attempts to access a particular message stored therein. If the callee is not trying to access the voicemail server or a message stored therein, control jumps to step S200 where the control sequence ends.

Otherwise, control continues to step S170 where a determination is made whether the callee is attempting to access a message for which an action has already been taken. If, for example, the callee is trying to access a new message, control jumps to step S200 where the control sequence ends. As discussed, an audible message can optionally also be associated with this new message, for example, that tells the user that the message is new, and information about the message such as caller ID information, duration, and the like.

If the callee is trying to access a message for which an action has already been taken, control continues to step S180. In step S180, a determination is made whether the action was replied to or forwarded. If the action was a "replied to," control continues to step S190 where a voice indication is played to the callee with an announcement that the message was replied to. Otherwise, if the message was forwarded, control continues to step S195 where a voice indication is played to the callee that the message was forwarded. From steps S190 and S195, control continues to step S200 where the control sequence ends.

In accordance with another exemplary embodiment, multiple flags, and hence corresponding multiple voice indications can be associated with a message. For example, if a voicemail was left for the callee, and the voicemail was archived but not responded to, the system could provide an indication that, for example, "This message was archived on DD:MM:YYYY and Time XX:XX:XX, but was not responded to or forwarded."

In accordance with yet another exemplary embodiment, information specific to the action taken by the callee can be provided to the callee in the voice indication. For example, the callee, upon accessing a voicemail, could be informed that "You called the sender in reference to this message on DD:MM:YYYY and Time XX:XX:XX.

In accordance with an even further exemplary embodiment, the voice messaging server in cooperation with a communications server could dynamically review callee call log(s) to determine if an action had been taken in response to a voicemail left by a caller. For example, the server could search for a call from the callee to the same number (e.g., based on caller ID information from the caller) that was associated with the left voicemail. The server could then correlate and determine if the call from the callee back to the caller was made after the voicemail from the caller. If it was, the server could conclude that the return call by the callee was a response (i.e., a "Replied To") to the left voicemail message.

This concept could be expanded to include call log analysis of any endpoint associated with a communications server, and specifically to SIP enabled endpoints associated with a communications server and callee.

In accordance with another exemplary embodiment, another option would be to flag a message with a notation such as, "You called the sender in reference to this message at 10:30 on April 27." Thus, a record of user's response(s) to a message(s) could be provided when the user has responded to a message by creating another message. This general concept can be extended to also include responses that are made to a message by, for example, calling the sender, calling someone else, sending an IM, scheduling a meeting, and so.

One problem is that a recipient of a message can reply to it and can forward the original message with different comments to different people. For example, I can reply to you, and can forward your original message with additional comments to "Pat", and can forward your original message with different comments to "Jill."

Therefore, in accordance with another embodiment, for each message in a "received" folder, the user can be presented with a menu that would look something like this:

You replied to this message at 10:30 AM on April 27. To access the reply you sent, press 1.

You forwarded this message with a comment to Pat at 10:35 AM on April 27. To access that message, press 2.
You forwarded this message with a comment to Jill at 10:40 AM on April 27. To access that message, press 3.

Some exemplary advantages of this technique are that it does more than provide a record that says "You responded to Person X at Time Y"—it also allows rapid one-click access to each of the responses. This style of menu and functionality can implemented in TUIs, GUIs, and browser applications and need not be limited to the "received" folder but in general can be applied to any folder.

A number of variations and modifications of the invention can be used. It would be possible to provide or claims for some features of the invention without providing or claiming others.

The exemplary systems and methods of this invention have been described in relation to enhancing voice messaging. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for providing a status of one or more voice mail messages comprising:
    setting, by a voice messaging server, a flag associated with an accessed voice mail message, the flag having been dynamically set and associated with the voice mail message by the voice messaging server based on a callee's accessing of the voice mail message;
    accessing an audible message associated with the flag, wherein the audible message associated with the flag is a different message than the voice mail message; and
    playing, at a communications device, the audible message associated with the flag to the callee during a subsequent access of the voice mail message.

2. The method of claim 1, further comprising recognizing an action upon a stored voice mail message and flagging the message with a corresponding flag.

3. The method of claim 2, wherein the action is one or more of reply to, forward, archive, play and skip.

4. The method of claim 1, further comprising associating a custom audible message with a voice mail message.

5. The method of claim 1, wherein the audible message associated with the flag includes time information, date information and action information.

6. The method of claim 1, further comprising flagging the voice mail message as forwarded and wherein the audible message associated with the flag indicates that the voice mail message has been forwarded to another person.

7. The method of claim 1, further comprising flagging the voice mail message as replied to and wherein the audible message associated with the flag indicates that the callee has responded to a person who left the voice message.

8. The method of claim 1, further comprising playing status information related to the status of a voicemail box.

9. The method of claim 1, wherein multiple flags are associated with the voice mail message.

10. A non-transitory computer-readable information storage media having instructions stored thereon, that when executed by a processor, perform the steps of claim 1.

11. A system that provides status of one or more voice mail messages comprising:
   a voice messaging server that sets a flag associated with an accessed voice mail message, the flag having been dynamically set and associated with the voice mail message by the voice messaging server based on a callee's accessing of the voice mail message, accesses an audible message associated with the flag, wherein the audible message associated with the flag is a different message than the voice mail message, and forwards the audible message associated with the flag to the callee at a communications device for playback during a subsequent access of the voice mail message by the callee.

12. The system of claim 11, further comprising a database that recognizes and records an action taken upon a stored voice mail message and flags the message with a corresponding flag.

13. The system of claim 12, wherein the action is one or more of reply to, forward, archive, play and skip.

14. The system of claim 11, wherein a custom audible message is associated with a voice mail message.

15. The system of claim 11, wherein the audible message associated with the flag includes time information, date information and action information.

16. The system of claim 11, wherein the voice mail message is flagged as forwarded and wherein the audible message associated with the flag indicates that the voice mail message has been forwarded to another person.

17. The system of claim 11, wherein a voice mail message is flagged as replied to and wherein the audible message associated with the flag indicates that the callee has responded to a person who left the voice message.

18. The system of claim 11, wherein the voice messaging server is accessed by a packet-based, circuit-switched or SIP-based communications device.

19. The method of claim 1, further comprising:
   dynamically reviewing a call log of the callee to determine if callee has called a number associated with a person who left the voice mail message; and
   in response to determining that the callee has called the number associated with the person who left the voice mail message, flagging the voice mail message as replied to.

20. A method for providing a status of one or more voice mail messages comprising:
   reading, by a voice messaging server, a flag associated with a voice mail message, the flag having been dynamically associated with the voice mail message by the voice messaging server based on a callee's accessing of the voice mail message;
   accessing an audible message associated with the flag, wherein the audible message associated with the flag is a different message than the voice mail message;
   playing, at a communications device, the audible message associated with the flag to a user during a subsequent access of the voice mail message;
   forwarding the voice mail message to a first person;
   forwarding the voice mail message to a second person;
   flagging the voice message as forwarded; and
   wherein accessing the audible message associated with the flag further comprises accessing a different audible message via a menu for each of the forwarded voice mail messages.

* * * * *